(12) United States Patent
Callahan et al.

(10) Patent No.: US 8,262,021 B2
(45) Date of Patent: Sep. 11, 2012

(54) AIRCRAFT MOVEABLE STRUCTURE OBSTRUCTION DETECTION SENSOR PANEL

(75) Inventors: Kevin S. Callahan, Shoreline, WA (US); Jeffrey Dean Farnsworth, Marysville, WA (US)

(73) Assignee: The Boeing Company, Chicago, IL (US)

( * ) Notice: Subject to any disclaimer, the term of this patent is extended or adjusted under 35 U.S.C. 154(b) by 478 days.

(21) Appl. No.: 12/499,541

(22) Filed: Jul. 8, 2009

(65) Prior Publication Data

US 2011/0005137 A1    Jan. 13, 2011

(51) Int. Cl.
*B64D 13/00* (2006.01)
(52) U.S. Cl. .................. 244/118.5; 244/118.1; 49/28
(58) Field of Classification Search ............... 244/118.1, 244/118.5; 109/38–43, 49.5; 49/26–28
See application file for complete search history.

(56) References Cited

U.S. PATENT DOCUMENTS

| 4,422,521 A * | 12/1983 | Mochida .................. 180/271 |
| 5,441,218 A | 8/1995 | Mueller et al. |
| 5,839,694 A | 11/1998 | Bargull et al. |
| 6,547,183 B2 | 4/2003 | Farnsworth |
| 2008/0078870 A1 | 4/2008 | Kneller et al. |

OTHER PUBLICATIONS

European Search Report for EP10172975 dated Feb. 2, 2011.

* cited by examiner

*Primary Examiner* — Timothy D Collins
*Assistant Examiner* — Nicholas McFall
(74) *Attorney, Agent, or Firm* — Hope Baldauff Hartman, LLC

(57) ABSTRACT

Technologies are described herein for detecting obstructions, utilizing an obstruction detection system. According to one aspect of the disclosure, the system includes a moveable assembly that includes a moveable structure moveable between a stowed and operational configuration and has a leading surface facing a direction of movement when the moveable structure is moving between the stowed and operational configurations. A protective panel is attached to the moveable structure and has an outer surface separated from the leading surface by an over-travel distance. A proximity sensor detects a displacement of the protective panel towards the leading surface. A control module is responsive to at least one proximity sensor, such that when the proximity sensor detects the displacement of the protective panel towards the leading surface of the moveable structure so as to shorten the over-travel distance, the control module stops the movement of the moveable assembly.

20 Claims, 7 Drawing Sheets

AIRCRAFT MOVEABLE STRUCTURE OBSTRUCTION DETECTION SENSOR PANEL

FIELD OF THE DISCLOSURE

The present disclosure relates generally to detecting an obstruction to a moveable structure, and in particular to detecting an obstruction to a moveable stowage closet within an aircraft.

BACKGROUND

In commercial aircrafts, large boxes or aircraft stowage closets may be stowed in the ceiling area between galleys. These closets, also known as Overhead Cross Aisle Stowage (OCAS) boxes may be used by aircraft staff for various purposes. In order to access the OCAS box, a cabin attendant may lower the OCAS box using a control panel. In some aircrafts, the control panel may be located away from the OCAS box, such that the cabin attendant operating the control panel may not be able to see the OCAS box while controlling the motion of the OCAS box. For this reason and others, interferences are possible between the OCAS box and any obstructions in the path of the OCAS box, such as a galley door, a slide out table, a galley cart or any other item that is left out in the path of the moving OCAS box. In some cases, the damage to equipment caused by the interference may result in additional effort in terms of repairing or replacing the OCAS box or galley parts.

It is with respect to these considerations and others that the disclosure made herein is presented.

SUMMARY

Technologies are described herein for detecting an obstruction to a moveable structure, utilizing an obstruction detection system. According to one aspect of the disclosure, an obstruction detection system includes a moveable assembly that includes a moveable structure configured to move between a stowed configuration and an operational configuration and having a leading surface facing a direction of movement when the moveable structure is moving between the stowed configuration and the operational configuration. A protective panel is attached to the moveable structure and has an outer surface spaced apart from the leading surface by an over-travel distance. At least one proximity sensor is configured to detect a displacement of the protective panel towards the leading surface of the moveable structure. The obstruction detection system further includes a control module responsive to the at least one proximity sensor, such that when at least one proximity sensor detects the displacement of the protective panel towards the leading surface of the moveable structure so as to shorten the over-travel distance, the control module stops the movement of the moveable assembly between the stowed configuration and the operational configuration.

In another aspect of the present disclosure, a method of detecting obstructions includes moving a moveable structure between a stowed configuration and an operational configuration. The method also includes receiving an indication that a protective panel attached to the moveable structure is displaced towards a leading surface of the moveable structure, wherein the leading surface is facing a direction of movement when the moveable structure is moving to the stowed configuration or the operational configuration. Upon receiving the indication, halting the movement of the moveable structure between the stowed configuration and the operational configuration.

In yet another aspect, an obstruction detection system includes an aircraft stowage closet moveable between a stowed configuration and a loading configuration. The aircraft stowage closet has a leading surface facing a direction of movement when the aircraft stowage closet is moving between a stowed configuration and an operational configuration. A protective panel is attached to the aircraft stowage closet and has an inner surface spaced apart from the leading surface of the aircraft stowage closet by an over-travel gap. At least one proximity sensor is configured to detect a displacement of the protective panel towards the leading surface of the aircraft stowage closet. A motion controller is configured to move the aircraft stowage closet between the stowed configuration and the operational configuration as long as the at least one proximity sensor does not detect a displacement of the protective panel towards the leading surface of the aircraft stowage closet.

It should be appreciated that the above-described subject matter may also be implemented in various other embodiments without departing from the spirit of the disclosure. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
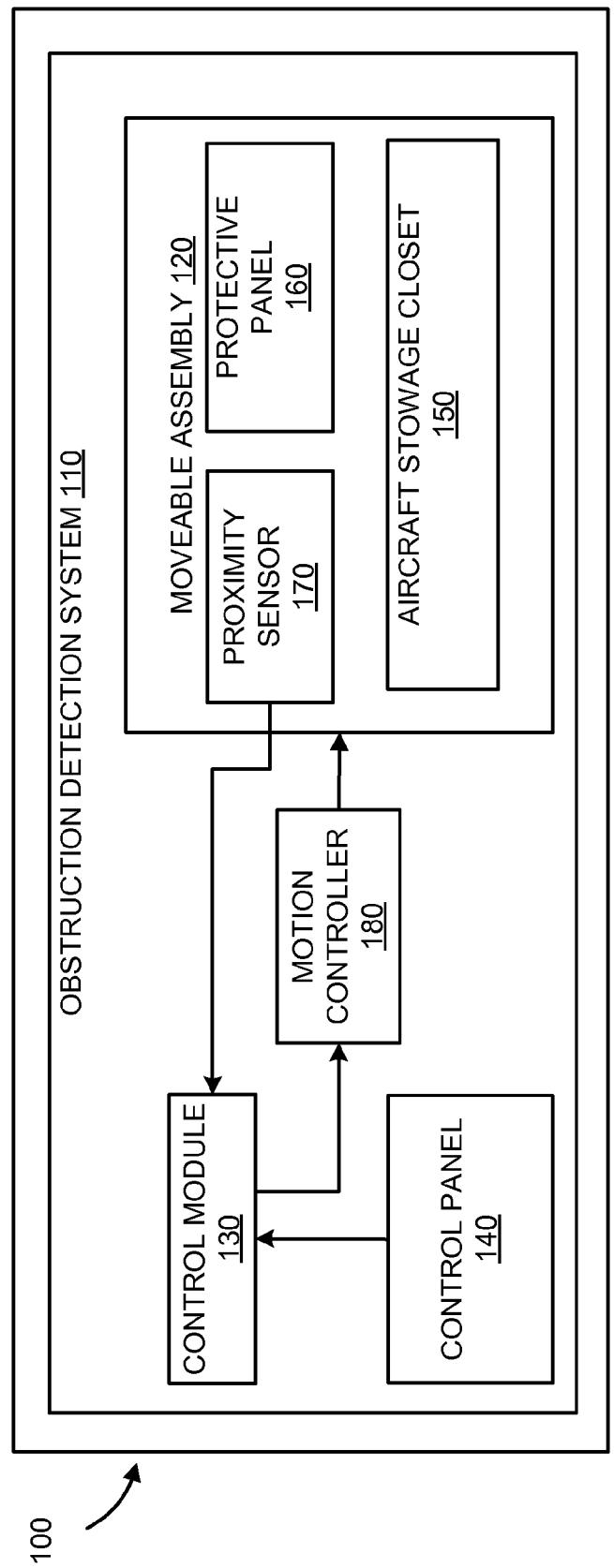
FIG. 1 is a block diagram of an obstruction detection system for an aircraft stowage closet installed within an aircraft, according to embodiments described herein.

The following detailed description is directed to apparatus and methods for detecting an obstruction to a moveable structure, utilizing an obstruction detection system. In the following detailed description, references are made to the accompanying drawings that form a part hereof, and which are shown by way of illustration, specific embodiments, or examples. Referring now to the drawings, in which like numerals represent like elements through the several figures, an obstruction detection system according to the various embodiments will be described. As described above, the obstruction detection system may be utilized to detect an obstruction to a moveable structure, such as an aircraft stowage closet within an aircraft.

FIG. 1 illustrates a block diagram of an obstruction detection system 110 within an aircraft 100, which includes a moveable assembly 120. The moveable assembly 120 further includes a moveable structure, such as an aircraft stowage closet 150. The moveable assembly 120 may also include a protective panel 160 and at least one proximity sensor 170. The protective panel 160 may be moveably attached to the aircraft stowage closet 150, as will be described below. The obstruction detection system 110 also includes a control panel 140, a control module 130 and a motion controller 180. The control panel 140, which may include an up-down switch or a touch pad, is configured to communicate with the motion controller 180, such as a stepper motor, that is capable of moving the aircraft stowage closet 150 between a stowed configuration and an operational or loading configuration. It should be appreciated that in the present embodiment, a stepper motor may be used to guide the aircraft stowage closet 150 along tracks (not shown), but in various embodiments, any actuation means capable of moving the aircraft stowage closet 150 between a stowed configuration and a loading configuration may be used.

The proximity sensor 170 of the moveable assembly 120 may be configured to detect obstructions that lay in the path of the aircraft stowage closet 150. It should be appreciated that the proximity sensor 170 may be any type of sensor that is capable of detecting obstructions that lay in the path of the aircraft stowage closet 150. Examples of such sensors may include pressure-sensitive sensors, optical sensors, touch sensors, microswitches and inductive sensors. The proximity sensor 170 may also be configured to communicate with the control module 130, which may be a computer, such that when the proximity sensor 170 is triggered, the control module 130 operative stops the motion of the aircraft stowage closet 150.

In various embodiments, the control module 130 may stop communicating with the motion controller 180, thereby stopping the motion of the aircraft stowage closet 150 or may simply stop the power supply to the motion controller 180 directly. In other alternate embodiments, the proximity sensor 170 may operate as a switch for the motion controller 180, such that when the proximity sensor 170 is triggered, the switch is opened and power is no longer supplied to the motion controller 180.

It should be appreciated by those skilled in the art, that the scope of the present disclosure is not limited to the embodiments described herein, but also includes embodiments where the motion of the aircraft stowage closet is stopped upon coming into contact with an obstruction, including, but not limited to, embodiments that use a proximity sensor, control module, a control panel and motion controllers. Further details regarding the configuration and operation of the moveable assembly are described below in FIGS. 2-6.

Figure 2:
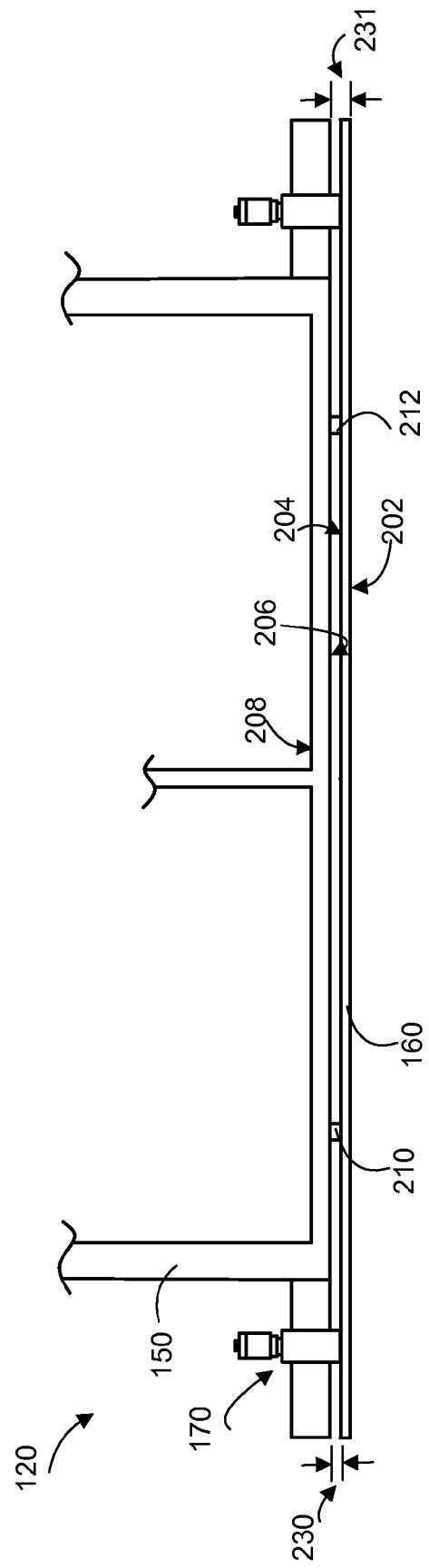
FIG. 2 is a side view of a moveable assembly of the obstruction detection system, according to embodiments described herein.

FIG. 2 illustrates a side view of the moveable assembly 120 described in FIG. 1. The moveable assembly 120 includes the aircraft stowage closet 150. The aircraft stowage closet 150 has a leading surface 206, which faces the direction of movement when the moveable structure 150 is advancing or moving to the operational or loading configuration. The leading surface 206 is also susceptible to damage due to interferences with other objects present within the aircraft 100. In various embodiments, the leading surface 206 of the aircraft stowage closet 150 may be the bottom surface, while the opposite side of the leading surface 206 is an internal surface 208 of the aircraft stowage closet 150.

As described above, the moveable assembly 120 also includes the protective panel 160 that has an outer surface 202 and an inner surface 204. The outer surface 202 and the inner surface 204 of the protective panel 160 may have dimensions that match the dimensions of the leading surface 206 of the aircraft stowage closet 150. Further, the moveable assembly 120 is configured such that the inner surface 204 of the protective panel 160 is facing the leading surface 206 of the aircraft stowage closet 150 and the outer surface 202 of the protective panel is facing the direction of movement when the aircraft stowage closet 150 is advancing to the operational configuration. The protective panel 160 may be made of a material that is impact resistant, such that if the outer surface 202 of the protective panel 160 comes into contact with an obstruction, the outer surface 202 of the protective panel 160 remains intact. Further, the protective panel 160 may be made of an elastic material that may absorb some of the force imparted by the obstruction upon impact.

The protective panel 160 may be attached to the aircraft stowage closet 150 using at least one attachment means 210, such that the protective panel 160 can be displaced towards and away from the leading surface 206 in the direction of travel of the aircraft stowage device. Also, the leading surface 206 of the aircraft stowage closet 150 and the inner surface 204 of the protective panel 160 may be aligned. By aligning the inner surface 204 of the protective panel 160 to the leading surface 206 of the aircraft stowage closet 150 and matching the size of the protective panel 160 and the leading surface 202 of the aircraft stowage closet 150, the entire area of the leading surface 206 may be protected by the protective panel 160. In addition, the entire protective panel 160 may act as a sensor panel that is responsive to any contact with obstructions on any portion of the protective panel 150.

The moveable assembly may further include an over-travel gap 230 between the inner surface 204 of the protective panel 160 and the leading surface 206 of the aircraft stowage closet 150, such that the protective panel 160 does not contact the leading surface 206 when the protective panel 160 is in or out of contact with an obstruction. When the protective panel 160 is not in contact with an obstruction, the size of the over-travel gap 230 between the protective panel 160 and the leading surface 206 of the aircraft stowage closet 150 is the maximum over-travel gap (See. 232 at FIG. 6).

The outer surface 202 of the protective panel 160 and the leading surface 206 of the aircraft stowage closet 150 may be separated by an over-travel distance 231. In various embodiments, the protective panel 160 may be an elastic material that is attached to the aircraft stowage closet 150 such that there is no over-travel gap 230 between the protective panel 160 and the leading surface 206 of the aircraft stowage closet 150. In such embodiments, there will still be an over-travel distance 231 between the protective panel 160 and the leading surface 206 of the aircraft stowage closet 150. The over-travel distance 231 may be at a maximum over-travel distance 233 when the protective panel 150 is not in contact with an obstruction, and the over-travel distance 231 may become smaller than the maximum over-travel distance 233 when the protective panel 150 is in contact with an obstruction, as will be described in further detail with regard to FIGS. 5 and 6.

In various embodiments, the protective panel 160 may be attached to the aircraft stowage closet 150 with adjustable attachment means, such that the maximum over-travel gap 232 may be adjusted in a manner so that when the moveable assembly 120 is in the stowed configuration, the outer surface 202 of the protective panel 160 is flush with surfaces surrounding the moveable assembly 120. However, it should be appreciated that the size of the over-travel gap 230 should not be large enough to allow undesirable pollutants or objects to get trapped within the over-travel gap 230, which may adversely affect the performance of the obstruction detection system 110.

Still referring to FIG. 2, according to one embodiment, at least one elastic element 212 is positioned within the over-travel gap 230 between the leading surface 206 and the inner surface 204 of the protective panel 160. The elastic element 212 may be a spring, elastic foam or other material that may allow the protective panel 160 to be displaced towards the leading surface 206 upon impact. The elastic element 212 is responsive to force being applied by the protective panel 160 caused by an obstruction being in contact with the protective panel 160. In addition, the over-travel gap 230 may be adjusted such that the preload of the elastic element may be set to match a desired sensitivity for the proximity sensor. If the over-travel gap 230 is large, there is a smaller preload on the elastic element 212, while if the over-travel gap 230 is small, there is a larger preload on the elastic element 212. The larger the pre-load, the greater the force needed to displace the protective panel 160 towards the leading surface 206 of the aircraft stowage closet 150.

As will be described in further detail with regards to FIGS. 5 and 6, when the protective panel 160 comes into contact with an obstruction, the obstruction may cause the protective panel 160 to be displaced towards the leading surface 206 such that the over-travel gap 230 becomes narrower than the maximum over-travel gap 232. The distance the protective panel 160 is displaced is known as the interference travel distance. The elastic element 212 should be elastic enough to allow the protective panel 160 to travel towards the leading surface 206, but not allow the interference travel distance to exceed the maximum over-travel gap 232 between the protective panel 160 and the leading surface 206, such that the protective panel 150 comes into contact with the leading surface 206.

In various embodiments, the elastic element 212 may be placed between the leading surface 206 and the protective panel 160 with a preload that imparts a resisting force on the protective panel 160, such that once the obstruction is no longer in contact with the protective panel 160, the protective panel 160 returns to a position where the over-travel gap 230 between the protective panel 160 and the leading surface 206 is the maximum over-travel gap 232.

It should be understood that by placing an elastic element between the aircraft stowage closet 150 and the protective panel 160, and suspending the protective panel 160 from the aircraft stowage closet 150 using attachment means, the protective panel 160 is capable of moving towards and away from the leading surface 206 of the aircraft stowage closet 150, without ever separating from the aircraft stowage closet 150 beyond the maximum over-travel gap 232. In various embodiments, the moveable assembly 120 may not include an elastic element. In such embodiments, the protective panel may return to the maximum over-travel gap 232 if someone either manually moves the protective panel to the maximum over-travel gap 232 or through gravitational forces acting on the protective panel.

As described above, in typical operating environments, the moveable assembly 120 may be stowed overhead, such that when access to the aircraft stowage closet 150 is needed, the moveable assembly 120 is lowered down from the ceiling by a cabin attendant to a loading configuration via the computerized control panel 140. In some aircrafts, the control panel 140 may be located at a place where a cabin attendant operating the control panel 140 may not be able to see the aircraft stowage closet 150 as it is being lowered or raised. Therefore, obstructions lying in the path of the aircraft stowage closet 150 may not be visible to cabin attendants operating the control panel 150. As such, the aircraft stowage closet 150 may collide while obstructions that lay in the path of the aircraft stowage closet 150, resulting in extensive damage to the leading surface 206 of the aircraft stowage closet 150. The present disclosure has therefore, been designed to reduce the risk of damage to the aircraft stowage closet 150 caused by these obstructions by utilizing the obstruction detection system 110 that includes the moveable assembly 120 configured to detect obstructions.

Figure 3:
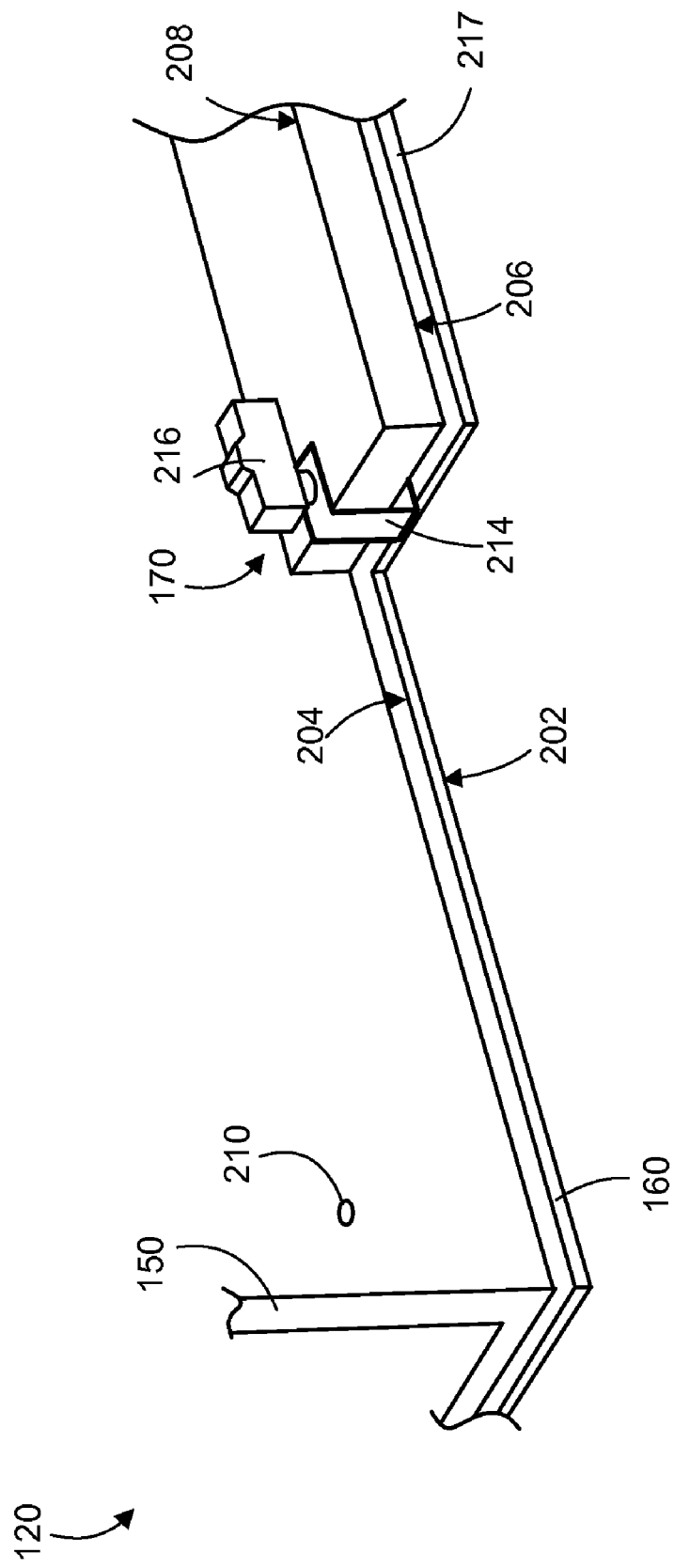
FIG. 3 is a top perspective view of the moveable assembly of the obstruction detection system, according to embodiments described herein.
Figure 4:
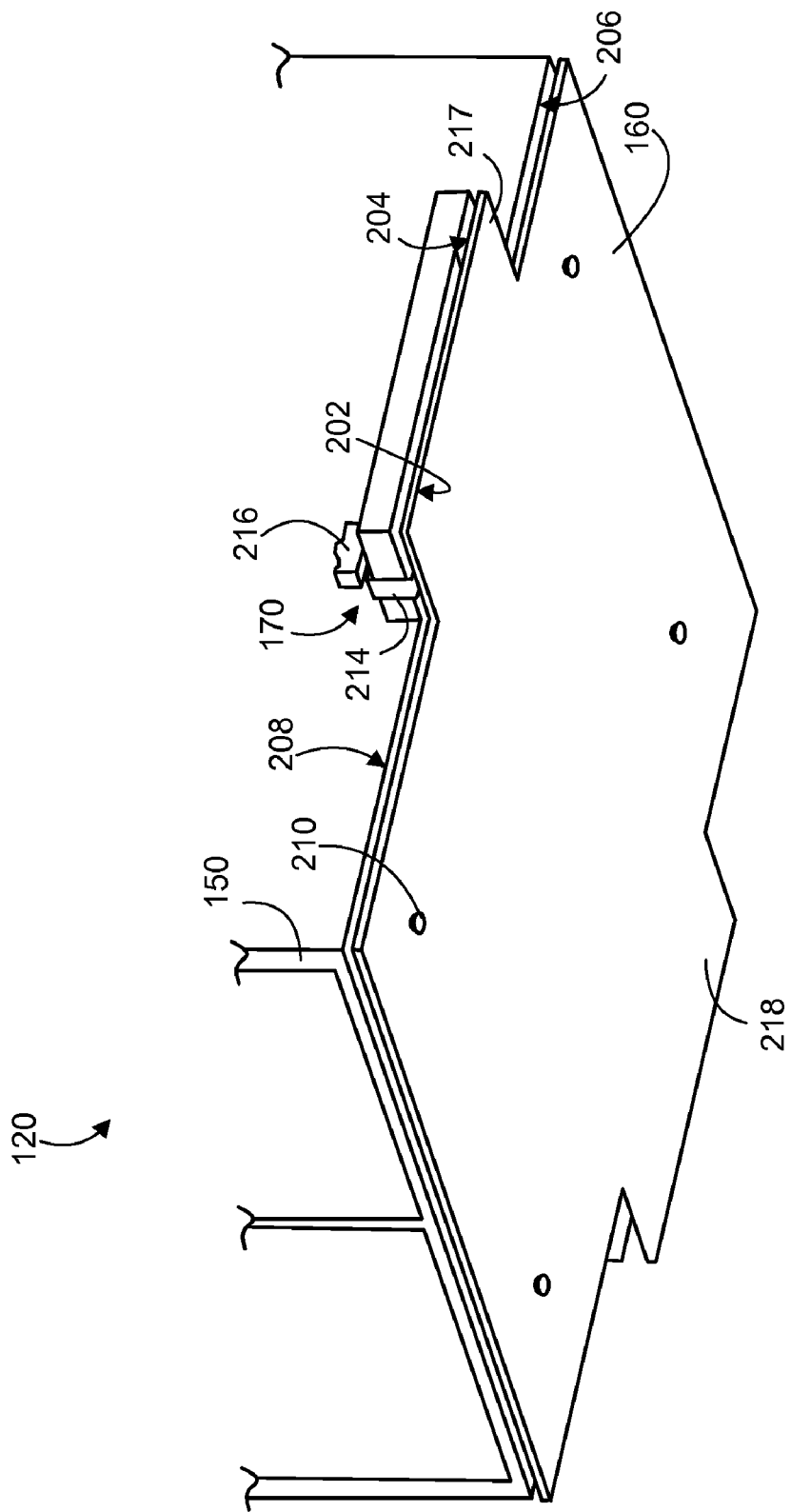
FIG. 4 is a bottom perspective view of the moveable assembly of the obstruction detection system, according to embodiments described herein.

FIGS. 3 and 4 show a top view and a bottom view of the moveable assembly 120, respectively. In the present embodiment, the aircraft stowage closet 150 may have a generally rectangular shape, with two abutments 217 and 218 abutting from two of its sides. Various embodiments of the aircraft stowage closet 150 may be shaped specifically to fit in the space in which it is being placed. Therefore, the present disclosure is not limited to aircraft stowage closets having a rectangular shape or abutments, but includes other moveable structures having any shape and size that may be damaged by interferences with obstructions.

The moveable assembly 120 further includes the at least one proximity sensor 170 that is configured to detect obstructions, as described above in regard to FIG. 1. In the present embodiment, the proximity sensor 170 is positioned on each of the two abutments 217 and 218. In various embodiments, only one proximity sensor may be sufficient to fulfill the functional requirements of the obstruction detection system 110. The proximity sensor 170 described herein, includes a mounting bracket 214 and a switch 216 that is attached to a first end of the mounting bracket 214. A second end of the mounting bracket 214 is attached to the protective panel 160, such that the proximity sensor 170 is configured to move with the displacement of the protective panel 160. It should be appreciated that the mounting bracket 214 may be attached to the protective panel 160 using conventional attachment means known to those skilled in the art.

Figure 5:
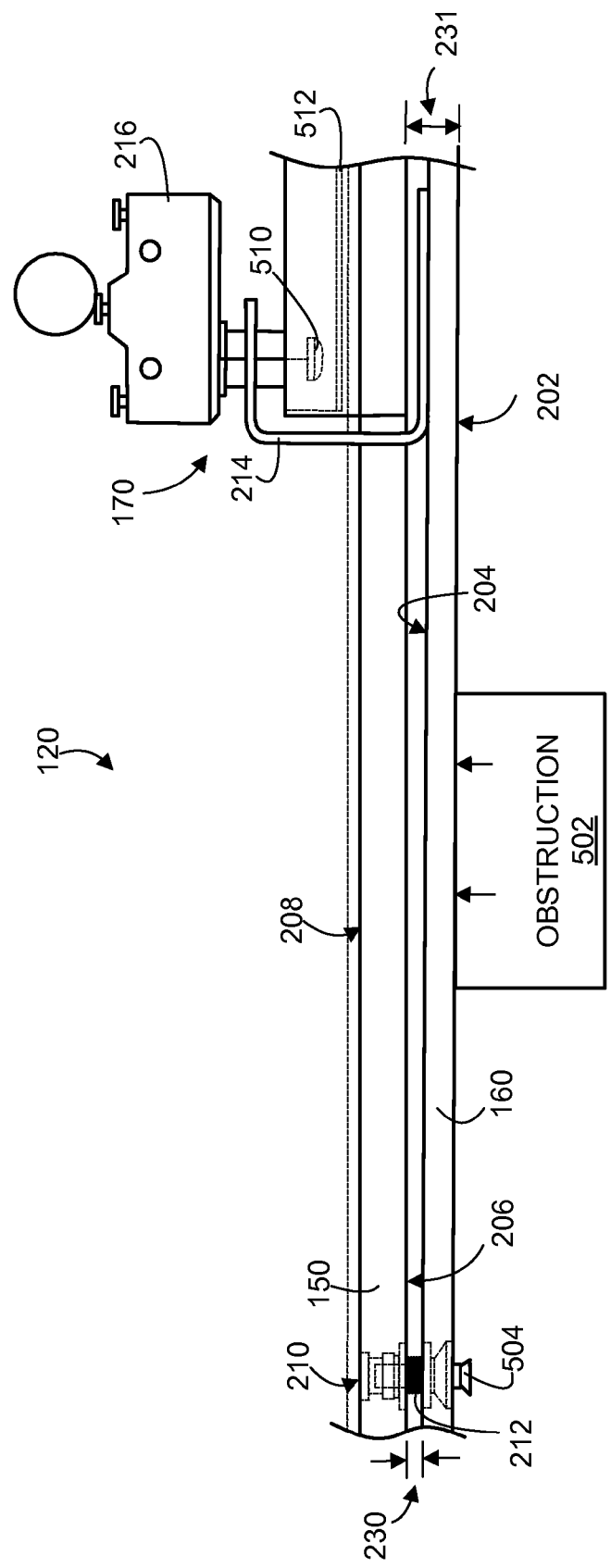
FIG. 5 is an enlarged side view of the moveable assembly of the obstruction detection system, when the moveable assembly is in contact with an obstruction, according to embodiments described herein.
Figure 6:
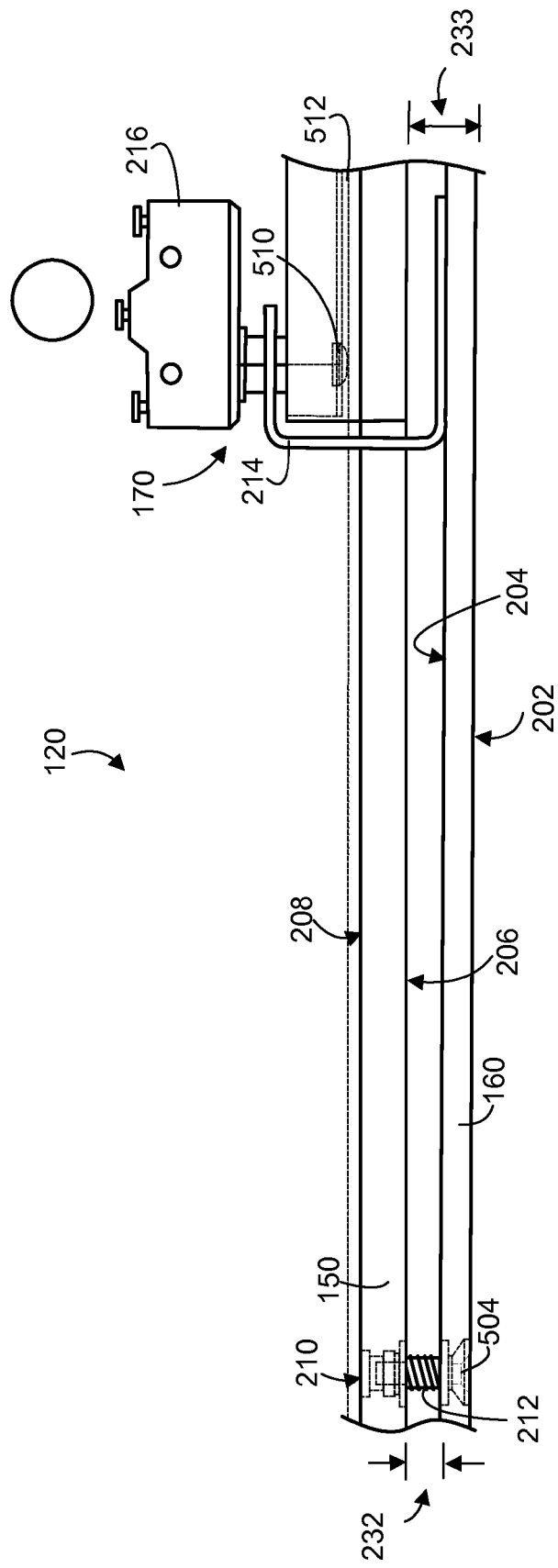
FIG. 6 is an enlarged side view of the moveable assembly of the obstruction detection system, when the moveable assembly is out of contact with an obstruction, according to embodiments described herein.

Referring now to FIGS. 5 and 6, additional details regarding the configuration and operation of the moveable assembly 120 and the proximity sensor 170 are described. As shown in FIGS. 5 and 6, the attachment means 210, which may be a bolt, passes through the elastic element 212, which may be a spring, such that the elastic element 212 surrounds the attachment means 210. In various embodiments, the elastic element 212 and the attachment means 210 may not be coupled together or be in close proximity to one another. In addition, the attachment means 210 may be secured to the internal surface 208 of the aircraft stowage closet 150 using a nut, or other securing component on one end.

The attachment means 210 also passes through protective panel 160, such that the protective panel 160 may be displaced towards and away from the leading surface 206 of the aircraft stowage closet 150, while the displacement of the protective panel 160 in a direction parallel to the leading surface 206 of the aircraft stowage closet 150 may be limited. The other end of the attachment means 210 suspends the protective panel 160 from the aircraft stowage closet 150, such that there is the over-travel gap 230 between the protective panel 160 and the leading surface 206 of the aircraft stowage closet 150. It should be appreciated that the height of the over-travel gap 230 may be altered by adjusting the attachment means 210, such as the nut-bolt assembly known to those skilled in the art. As described above, the size of the over-travel gap 230 may be sized such that when the moveable assembly is in the stowed configuration, the outer surface of the protective panel is flush with the surrounding surfaces of the aircraft and further sized to reduce the risk of undesirable objects from getting into the over-travel gap 230.

FIG. 5 is an enlarged side view of the moveable assembly 120, when the moveable assembly 120 is in contact with an obstruction. The proximity sensor 170 includes the mounting bracket 214 and the switch 216. The switch 216 further includes an actuator 510 that may be a push button, or some other form of actuator for a switch. When the moveable assembly is in contact with an obstruction 502, the actuator 510 of the switch 216 is not in contact with a raised surface 512 of the aircraft stowage closet 150. The proximity sensor 170 moves away from the raised surface 512 due to the force imparted by the obstruction 502 towards the moveable assembly 150. The actuator 510 may include an ON state and an OFF state. When the actuator 510 is in contact with the raised surface 512 as shown on FIG. 6, the actuator 510 is in the ON state, whereby an internal circuit (not shown) in the switch 216 is closed. When the internal circuit in the switch 216 is closed, electrical current flows through the switch 216 and the control module 130 is alerted that a signal, which may be a current is being received. In various embodiments, the raised surface may be any surface that is part of the moveable assembly, which triggers the actuator 510 to alter states between the ON state and the OFF state, such that when the actuator 510 is in contact with the raised surface 512, the actuator is in the ON state and the internal circuit of the switch 216 is complete or closed, and the sensor 170 is triggered, and when the actuator 510 is out of contact with the raised surface 512, the internal circuit of the switch 216 is broken or open, thereby not triggering the proximity sensor 170. Because the mounting bracket 214 is attached to the protective panel 160 and the switch 216 is connected to the mounting bracket 214, the position of the actuator 510 of the switch 216 is determined by the position of the protective panel 160 relative to the leading surface 206 of the aircraft stowage closet 150. It should be appreciated that in alternate embodiments, the internal circuit of the switch is open when the obstruction is in contact with the moveable assembly and the internal circuit of the switch is closed when the obstruction is out of contact with the moveable assembly.

According to embodiments, when the over-travel gap 230 between the protective panel 160 and the leading surface 206 is less than a threshold trigger distance, the actuator 510 of the switch 216 is out of contact with the raised surface 512. The threshold trigger distance is the maximum distance between the protective panel 160 and the leading surface 206 when the actuator 510 of the switch 216 is not in contact with the raised surface 512, such that if the over-travel gap is less than the threshold trigger distance, the proximity sensor 170 is triggered. In various embodiments, the threshold trigger distance may be less than the maximum over-travel gap 232 and greater than the maximum interference travel distance, which is the maximum distance the protective panel 160 can travel before the protective panel 160 stops moving relative to the leading surface 206. This will ensure that when the protective panel comes into contact with an obstruction, the proximity sensor 170 is triggered, the moveable assembly 120 comes to rest upon the proximity sensor being triggered, and that the protective panel 160 does not come in contact with the leading surface 206.

Referring specifically to FIG. 5, the outer surface 202 of the protective panel 160 is in contact with an obstruction 502. The obstruction 502 may impart a force in a direction towards the leading surface 206 of the aircraft stowage closet 150, as indicated by the arrows. If the force imparted by the obstruction 502 is greater than the resisting force imparted by the elastic element 212, the protective panel 160 is displaced towards the leading surface 206, reducing the over-travel gap 230 between the protective panel 160 and the leading surface 206. Once the over-travel gap 230 is equal to the threshold trigger distance, the actuator 510 of the switch 216 comes out of contact with the raised surface 512, triggering the proximity sensor 170. Upon the proximity sensor 170 being triggered, the control module 130 may communicate a command to stop the motion controller 180 from moving the moveable assembly 120 towards the obstruction 502.

FIG. 6 illustrates an enlarged side view of the moveable assembly 120, when the moveable assembly 120 is not in contact with an obstruction. When the obstruction 502 is no longer in contact with the moveable assembly 120, the force imparted by the obstruction 502 in FIG. 5 is removed. The resisting force exerted by the elastic element 212 may cause the protective panel 160 to be displaced away from the leading surface 206, such that the over-travel gap 230 is increased to the maximum over-travel gap 232. As a result, the actuator 510 of the switch 216 also moves and comes into contact with the raised surface 512 again. Once the actuator 510 comes back into contact with the raised surface 512, the proximity sensor 170 is no longer triggered. In various embodiments, the control module 130 may allow the control panel 140 to resume controlling the motion of the moving assembly 120 once the proximity sensor 170 is no longer triggered. However, in alternate embodiments, the control module 130 may require additional input prior to allowing the control panel 140 to resume control of the motion of the moving assembly 120.

It should also be appreciated that when the over-travel gap 230 is increased to the maximum over-travel gap 232, the head of the attachment bolt 504 may not extend out from the protective panel. When the protective panel is displaced towards the leading surface 206 of the aircraft stowage closet 150, the head of the attachment bolt 504 may extend out from the outer surface of the protective panel 160 as shown in FIG. 5. It should be noted that the over-travel distance gap 230 and the over-travel distance 231 shown in FIG. 5 are smaller than the maximum over-travel distance gap 232 and the maximum over-travel distance 233, as shown in FIG. 6.

In various embodiments, a pressure-sensitive sensor film may be attached to the outer surface 202 of the protective panel 160. The sensor film may be configured to operate as a pressure sensor, such that when the sensor film detects a minimum threshold pressure anywhere on its surface, the pressure sensor generates a signal indicating that the protective panel is in contact with an obstruction, and communicates it to the control module 130. The minimum threshold pressure is the minimum amount of force imparted on the sensor film that will trigger the pressure sensor to generate and send the signal to the control module 130. It should be appreciated that the pressure-sensitive sensor film may be displaced towards the leading surface 206 of the aircraft stowage closet 150 upon contact with an obstruction. Those skilled in the art should appreciate that the pressure-sensitive sensor film may be attached to the protective panel 160 using various attachment means, such as bonding. Additionally, in this embodiment, the need for the proximity sensor 170 may not be required. Because a proximity sensor may not be required, the inner surface 204 of the protective panel 160 may be bonded directly to the leading surface 206 of the aircraft stowage closet 150.

Figure 7:
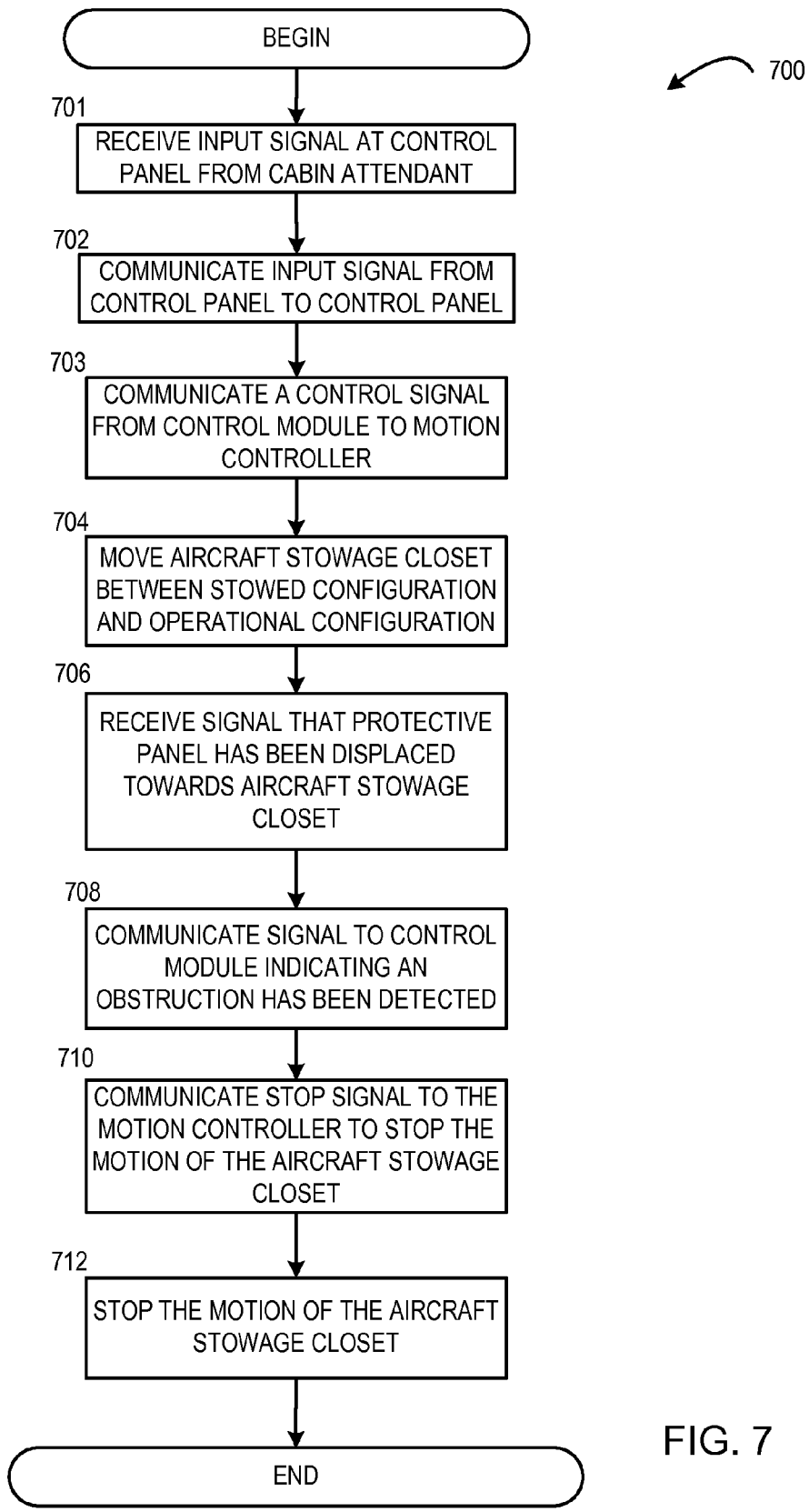
FIG. 7 is a logical flow diagram illustrating a routine for detecting an obstruction to a moveable structure, utilizing an obstruction detection system, according to embodiments described herein.

FIG. 7 is a logical flow diagram illustrating a routine 700 for protecting a leading surface of the aircraft stowage closet using the moveable assembly, according to embodiments described herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

The routine 700 begins at operation 701, where the control panel 140 receives an input signal from a cabin attendant operating the aircraft stowage closet 150 via the control panel 140. From operation 701, the routine 700 proceeds to operation 702, where the input signal is sent from the control panel 140 to the control module 130 to move the aircraft stowage closet 150 between the stowed configuration and the operational configuration. From operation 702, the routine 700 proceeds to operation 703, where the control module 130 sends a control signal to the motion controller, such that the motion controller 180 moves the aircraft stowage closet 150 according to the input signal communicated by the control panel 140 to the control module 130. From operation 703, the routine 700 proceeds to operation 704, where the motion controller 180 moves the aircraft stowage closet between the stowed configuration and the operational configuration. From operation 704, the routine 700 proceeds to operation 706, where the moveable assembly 120 comes into contact with an obstruction, such that the proximity sensor 170 is triggered, generating a signal that indicates that the protective panel 160 has been displaced towards the leading surface 206 of the aircraft stowage closet 150. In the present embodiment, when the actuator 510 of the switch 216 is displaced out of contact with the raised surface 512, the actuator 510 is in the OFF state, such that the switch 216 generates a signal that indicates that the protective panel 160 has been displaced towards the leading surface 206 of the aircraft stowage closet 150. This signal is communicated to the control module 130. From operation 706, the routine proceeds to operation 708, where the control module 130 receives the signal indicating that the protective panel 160 has been displaced towards the leading surface 206 of the aircraft stowage closet 150. The routine 700 then proceeds to operation 710, where the control module 130 sends a control signal to the motion controller 180 to stop any further motion of the aircraft stowage closet 150. It should be appreciated that various embodiments may employ different methods for stopping the aircraft stowage closet 150 from moving towards the obstruction once the proximity sensor is triggered. From operation 710, the routine 700 ends at operation 712, when the motion controller 180 stops the movement of the aircraft stowage closet 150.

It should be appreciated that the present disclosure may utilize various embodiments not described herein. Furthermore, as discussed above, the protective panel may be sized to match the footprint of the leading surface of the aircraft stowage closet to not only protect the leading surface from damage, but to also act as a sensor panel that is responsive to any contact with obstructions on any portion of the protective panel. Further, the use of proximity sensors may be replaced with other types of sensors, such as pressure sensors or optical sensors, inductive sensors, amongst others. In addition, in order to prevent the protective panel from being damaged during interferences with obstructions, the material used to manufacture the protective panel may be selected by considering various factors, such as the weight, durability, aesthetics, elasticity, cost, as well as construction issues amongst others. Further, as mentioned above, the scope of the present disclosure is not limited to aircraft stowage closets or moveable structures within an aircraft, but includes any moveable structure whose motion may be stopped upon detecting an obstruction.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An obstruction detection system, comprising:
 a moveable assembly, comprising
  a moveable structure configured to move between a stowed configuration and an operational configuration, and having a leading surface, the leading surface facing a direction of movement when the moveable structure is moving between the stowed configuration and the operational configuration,
  a protective panel attached to the moveable structure, the protective panel having an outer surface spaced apart from the leading surface by an over-travel distance, an inner surface facing the leading surface of the moveable structure, and an outer edge around a perimeter of the outer surface and the inner surface,
  at least one proximity sensor configured to detect a displacement of the protective panel towards the leading surface of the moveable structure; and
 a control module responsive to the at least one proximity sensor, such that when the at least one proximity sensor detects the displacement of the protective panel towards the leading surface of the moveable structure so as to shorten the over-travel distance, the control module stops the movement of the moveable assembly between the stowed configuration and the operational configuration.

2. The system of claim 1, wherein the moveable assembly is configured to detect an obstruction that comes into contact with any portion of the outer surface of the protective panel.

3. The system of claim 1, further comprising an over-travel gap between an inner surface of the protective panel and the leading surface of the moveable structure, such that when the proximity sensor detects the displacement of the protective panel towards the leading surface of the moveable structure, the over-travel gap is narrowed.

4. The system of claim 1, further comprising at least one elastic element positioned within the over-travel gap between the inner surface of the protective panel and the leading surface of the moveable structure, wherein the at least one elastic element imparts a resisting force on the inner surface of the protective panel opposing the displacement of the protection panel towards the leading surface of the moveable structure.

5. The system of claim 4, wherein the at least one elastic element comprises at least one of a spring and an elastic layer.

6. The system of claim 1, wherein the proximity sensor comprises:
 a pressure-sensitive sensor film configured to
  detect whether a minimum threshold pressure is imparted on the pressure-sensitive sensor film towards the leading surface of the moveable structure; and
  send a signal to the control module upon detecting that the minimum threshold pressure is imparted on the pressure-sensitive sensor film towards the leading surface of the moveable structure; and
 wherein the control module is configured to operatively stop the motion of the moveable structure upon receiving the signal from the pressure-sensitive sensor film that the minimum threshold pressure is imparted on the pressure-sensitive sensor film towards the leading surface of the moveable structure.

7. The system of claim 1, wherein the protective panel being the same size as the leading surface of the moveable structure.

8. A method of detecting obstructions, the method comprising:
 moving a moveable structure between a stowed configuration and an operational configuration;
 receiving an indication that a protective panel attached to the moveable structure is displaced towards a leading surface of the moveable structure, wherein the leading surface is facing a direction of movement when the moveable structure is moving to the stowed configuration or the operational configuration, and wherein the protective panel comprises an inner surface facing the leading surface of the moveable structure, an outer surface opposite the inner surface, and an outer edge around a perimeter of the outer surface and the inner surface; and
 halting the movement of the moveable structure between the stowed configuration and the operational configuration upon receiving the indication.

9. The method of claim 8, further comprising stopping the displacement of the protective panel towards the leading surface of the moveable structure by imparting a resisting force via elastic elements positioned between an inner surface of the protective panel and the leading surface of the moveable structure to maintain the protective panel out of contact with the leading surface of the moveable structure.

10. The method of claim 8, wherein moving the moveable structure from the stowed configuration to the operational configuration comprises:
 receiving an input signal from an operator at the control panel;
 communicating the input signal to the control module;
 generating a control signal corresponding to the input signal at the control module for controlling the movement of the moveable structure between the stowed configuration and the operational configuration; and
 controlling the movement of the moveable structure using a motion controller responsive to the control signal from the control module.

11. The method of claim 8, wherein receiving the indication comprises moving an actuator of a proximity sensor out of contact with a raised surface, and further comprising:
 detecting that the actuator is out of contact with the raised surface; and
 upon detecting that the actuator is out of contact with the raised surface, communicating a signal to a motion controller to halt the movement of the moveable structure between the stowed configuration and the operational configuration.

12. The method of claim 8, wherein moving the moveable structure between the stowed configuration and the operational configuration further comprises:
 receiving an input command at the control panel;
 generating a control signal at the control panel;
 supplying the control signal to a motion controller configured to control the movement of the moveable structure; and
 moving the moveable structure between the stowed configuration and the operational configuration until the motion controller no longer receives the control signal.

13. An obstruction detection system, comprising:
 an aircraft stowage closet configured to move between a stowed configuration and a loading configuration, the aircraft stowage closet having a leading surface, the leading surface facing a direction of movement when the aircraft stowage closet is moving between a stowed configuration and an operational configuration;
 a protective panel attached to the aircraft stowage closet, the protective panel having an inner surface spaced apart from the leading surface of the aircraft stowage closet by an over-travel gap, an outer surface opposite the inner surface, and an outer edge around a perimeter of the outer surface and the inner surface;
 at least one proximity sensor configured to detect a displacement of the protective panel towards the leading surface of the aircraft stowage closet; and
 a motion controller configured to move the aircraft stowage closet between the stowed configuration and the operational configuration as long as the at least one proximity sensor does not detect a displacement of the protective panel towards the leading surface of the aircraft stowage closet.

14. The system of claim 13, wherein the over-travel gap is adjustable in size.

15. The system of claim 13, further comprising at least one elastic element positioned within the over-travel gap between the inner surface of the protective panel and the leading surface of the aircraft stowage closet, wherein the at least one elastic element imparts a resisting force opposing the displacement of the protection panel towards the leading surface of the aircraft stowage closet.

16. The system of claim 15, wherein the at least one elastic element comprises at least one of a spring and an elastic layer.

17. The system of claim 13, wherein the at least one proximity sensor further comprises:
 a first proximity sensor positioned at a first side of the aircraft stowage closet; and
 a second proximity sensor positioned at a second side of the aircraft stowage closet opposite from the first side.

18. The system of claim 13, wherein the at least one proximity sensor comprises a pressure-sensitive sensor film configured to:
 detect a minimum threshold pressure being imparted on the pressure-sensitive sensor film towards the leading surface of the aircraft stowage closet; and
 send an indication to stop the motion of the aircraft stowage closet upon detecting that the minimum threshold pressure is imparted on the pressure-sensitive sensor film towards the leading surface of the aircraft stowage closet.

19. The system of claim 13, wherein the protective panel being the same size as the leading surface of the aircraft stowage closet.

20. The system of claim 13, wherein the protective panel is further configured to be displaced towards the leading surface of the aircraft stowage closet upon any portion of an outer surface of the protective panel coming into contact with an obstruction.

* * * * *